US012665149B1

(12) United States Patent
Baldwin

(10) Patent No.: US 12,665,149 B1
(45) Date of Patent: Jun. 23, 2026

(54) ADJUSTABLE WEATHERPROOF TOGGLE SWITCH COVER

(71) Applicant: Titan3 Technology LLC, Tempe, AZ (US)

(72) Inventor: Jeffrey P. Baldwin, Anthem, AZ (US)

(73) Assignee: Titan3 Technology LLC, Tempe, AZ (US)

( * ) Notice: Subject to any disclaimer, the term of this patent is extended or adjusted under 35 U.S.C. 154(b) by 291 days.

(21) Appl. No.: 18/399,944

(22) Filed: Dec. 29, 2023

Related U.S. Application Data

(60) Provisional application No. 63/444,672, filed on Feb. 10, 2023.

(51) Int. Cl.
*H01H 23/14* (2006.01)
*H01H 23/06* (2006.01)
*H01H 23/24* (2006.01)

(52) U.S. Cl.
CPC .......... *H01H 23/145* (2013.01); *H01H 23/06* (2013.01); *H01H 23/24* (2013.01)

(58) Field of Classification Search
CPC ........... H01H 2221/032; H01H 23/143; H01H 23/30; H01H 23/025; H01H 2300/03; H01H 23/145; H01H 2221/016; H01H 23/14; H01H 23/04; H01H 23/168; H01H 2221/018; H01H 23/02; H01H 23/12; H01H 23/003; H01H 23/146; H01H 23/16; H01H 23/20; H01H 23/28; H01H 23/00; H01H 23/148; H01H 23/24; H01H 23/26; H01H 23/06
See application file for complete search history.

(56) References Cited

U.S. PATENT DOCUMENTS 4,348,557 A * 9/1982 Sado .................... H01H 13/702 200/292
4,425,487 A * 1/1984 Hsieh ................... H01H 23/164 200/557
4,597,681 A * 7/1986 Hodges ...................... B41J 5/10 400/489
5,319,996 A * 6/1994 Harris .................... H01H 21/26 200/557
6,586,694 B2 7/2003 Shotey
7,977,594 B1 * 7/2011 Miserendino .......... H01H 21/30 200/330

(Continued)

*Primary Examiner* — Ahmed M Saeed
(74) *Attorney, Agent, or Firm* — Kenneth C. Booth; Booth Udall, PLC

(57) ABSTRACT

A switch cover with an electrical switch, a housing, a cover plate, and at least two screw bosses. The electrical switch is configured to toggle between an on position and an off position. The housing is configured to couple with the electrical switch. The cover plate is configured to pivotably couple with the housing and cover a switch opening extending through the housing. The cover plate is configured to operatively couple with the electrical switch such that when the cover plate is moved to a first position, the electrical switch moves to the on position and when the cover plate is moved to a second position, the electrical switch moves to the off position. A tortuous path for contaminants to enter the housing may be created by a lip configured to insert between an external ridge and an internal ridge when the cover plate is coupled with the housing.

19 Claims, 10 Drawing Sheets

(56) References Cited

U.S. PATENT DOCUMENTS

2012/0142418 A1* 6/2012 Muramatsu ............. A63F 13/24
463/37
2019/0042007 A1* 2/2019 Lu ........................... G06F 3/033
2022/0344112 A1* 10/2022 Kleine-Hollenhorst .....................
H01H 13/04

* cited by examiner

ADJUSTABLE WEATHERPROOF TOGGLE SWITCH COVER

RELATED APPLICATIONS

This application claims the benefit of U.S. provisional patent application 63/444,672, filed Feb. 10, 2023 to Jeffrey P. Baldwin, titled "Adjustable Weatherproof Toggle Switch Cover," the entirety of the disclosure of which is hereby incorporated by this reference.

TECHNICAL FIELD

This document relates to a weatherproof, also known as a weather-resistant, toggle switch and housing. More specifically, this document relates to a weatherproof toggle switch with a housing and switch that is adjustable.

BACKGROUND

In some cases, electrical switches need to be weatherproof to avoid the possibility of water entering the switch and shorting the electrical circuit. When a cover is implemented for this purpose, the cover sometimes includes a cover switch that couples with the electrical switch to allow the user to control the electrical switch. Due to differences in installation sites, the connection between the cover switch and the electrical switch can have a "loose" or unsecure feel when pressed, and in some cases does not fully activate the electrical switch. Additionally, gaskets are sometimes used to restrict water access and make the electrical switch suitable for wet locations. These gaskets can malfunction, get dislodged, or become dried and allow water to pass them. Adding a gasket also increases the complexity of manufacture and installation for switch covers.

SUMMARY

Aspects of this document relate to an adjustable weatherproof switch cover, comprising an electrical switch configured to be installed on a structural surface and toggle between an on position and an off position, a housing configured to couple with the electrical switch and enclose the electrical switch against the structural surface, wherein the housing has a switch opening configured to expose the electrical switch, two pivot supports extending rearward from the housing and positioned across from each other on either side of the switch opening, an internal ridge extending forward from the housing surrounding the switch opening, and an external ridge extending forward from the housing surrounding the internal ridge, a cover plate having two pivot arms extending rearward from the cover plate, the two pivot arms configured to pivotably couple with the two pivot supports of the housing to position the cover plate to cover the switch opening of the housing and allow the cover plate to pivot between a first position and a second position, wherein the cover plate further has a lip extending rearward from the cover plate configured to insert between the external ridge and the internal ridge when the cover plate is coupled with the housing to create a tortuous path for contaminants to enter the housing, and at least two screw bosses extending rearward from a rear surface of the cover plate, each of the at least two screw bosses having a screw threadedly coupled therein, wherein each of the screws is adjustable to establish contact between each of the screws and the electrical switch when the cover plate is coupled to the housing and operatively couple the cover plate to the electrical switch such that when the cover plate is moved to the first position, the electrical switch moves to the on position and when the cover plate is moved to the second position, the electrical switch moves to the off position.

Particular embodiments may comprise one or more of the following features. The switch cover may further comprise a protective cap positioned on an end of each of the screws and configured to protect the electrical switch from damage caused by the contact between each of the screws and the electrical switch. The housing may comprise at least one screw aperture configured to receive a mounting screw to couple the housing with the electrical switch. Each of the pivot supports of the housing and each of the pivot arms of the cover plate may have one of a pin and a corresponding aperture and each pin may be configured to mate with the corresponding aperture to pivotably couple the cover plate to the housing.

Aspects of this document relate to an adjustable weatherproof switch cover, comprising an electrical switch configured to be installed on a structural surface and toggle between an on position and an off position, a housing configured to couple with the electrical switch, wherein the housing has a switch opening configured to expose the electrical switch, an internal ridge extending forward from the housing surrounding the switch opening, and an external ridge extending forward from the housing surrounding the internal ridge, and a cover plate configured to pivotably couple with the housing and cover the switch opening of the housing, wherein the cover plate is pivotable between a first position and a second position and wherein the cover plate has a lip extending rearward from the cover plate configured to insert between the external ridge and the internal ridge when the cover plate is coupled with the housing to create a tortuous path for contaminants to enter the housing, wherein the cover plate is configured to operatively couple with the electrical switch such that when the cover plate is moved to the first position, the electrical switch moves to the on position and when the cover plate is moved to the second position, the electrical switch moves to the off position.

Particular embodiments may comprise one or more of the following features. The housing may be configured to enclose the electrical switch against the structural surface. The housing may further comprise two pivot supports extending rearward from the housing and positioned across from each other on either side of the switch opening, the cover plate having two pivot arms extending rearward from the cover plate, wherein the two pivot arms of the cover plate are configured to pivotably couple with the two pivot supports of the housing to allow the cover plate to pivot with respect to the housing. Each of the pivot supports of the housing and each of the pivot arms of the cover plate may have one of a pin and a corresponding aperture and each pin may be configured to mate with the corresponding aperture to pivotably couple the cover plate to the housing. The switch cover may further comprise at least two screw bosses extending rearward from a rear surface of the cover plate, each of the at least two screw bosses having a screw threadedly coupled therein, wherein each of the screws is adjustable to establish contact between each of the screws and the electrical switch when the cover plate is coupled to the housing and operatively couple the cover plate to the electrical switch. The switch cover may further comprise a protective cap positioned on an end of each of the screws and configured to protect the electrical switch from damage caused by the contact between each of the screws and the electrical switch.

Aspects of this document relate to an adjustable weatherproof switch cover, comprising a housing configured to couple with an electrical switch, wherein the electrical switch is configured to toggle between an on position and an off position and wherein the housing has a switch opening configured to expose the electrical switch, a cover plate configured to pivotably couple with the housing and cover the switch opening of the housing, wherein the cover plate is pivotable between a first position and a second position, and at least one protrusion extending rearward from a rear surface of the cover plate, wherein each of the at least one protrusion is adjustable to establish contact between the at least one protrusion and the electrical switch when the cover plate is coupled to the housing and the housing is coupled to the electrical switch, wherein the at least one protrusion is configured to operatively couple the cover plate to the electrical switch such that when the cover plate is moved to the first position, the electrical switch moves to the on position and when the cover plate is moved to the second position, the electrical switch moves to the off position.

Particular embodiments may comprise one or more of the following features. The electrical switch may be configured to be installed on a structural surface and the housing may be configured to enclose the electrical switch against the structural surface. The housing may further comprise two pivot supports extending rearward from the housing and positioned across from each other on either side of the switch opening, the cover plate having two pivot arms extending rearward from the cover plate, wherein the two pivot arms of the cover plate are configured to pivotably couple with the two pivot supports of the housing to allow the cover plate to pivot with respect to the housing. Each of the pivot supports of the housing and the pivot arms of the cover plate may have one of a pin and a corresponding aperture and each pin may be configured to mate with the corresponding aperture to pivotably couple the cover plate to the housing. The at least one protrusion may comprise a screw threadedly coupled with a screw boss on the rear surface of the cover plate. The housing may have an internal ridge surrounding the switch opening and the cover plate may have a lip configured to extend around the internal ridge of the housing when the cover plate is coupled with the housing to create a tortuous path for contaminants to enter the housing. The housing may have an external ridge surrounding the switch opening and the cover plate may have a lip extending away from the cover plate, wherein the external ridge of the housing is configured to extend around the lip of the cover plate when the cover plate is coupled with the housing to create a tortuous path for contaminants to enter the housing. One of the housing and the cover plate may have an internal ridge and an external ridge surrounding the internal ridge and the other of the housing and the cover plate may have a lip configured to insert between the external ridge and the internal ridge when the cover plate is coupled with the housing to create a tortuous path for contaminants to enter the housing. The switch cover may further comprise a protective cap positioned on an end of each of the at least one protrusion and configured to protect the electrical switch from damage caused by the contact between each of the at least one protrusion and the electrical switch. The housing may comprise at least one screw aperture configured to receive a mounting screw to couple the housing with the electrical switch.

The foregoing and other aspects, features, and advantages will be apparent from the DESCRIPTION and DRAWINGS, and from the CLAIMS if any are included.

BRIEF DESCRIPTION OF THE DRAWINGS

Implementations will hereinafter be described in conjunction with the appended and/or included DRAWINGS, where like designations denote like elements, and.

DETAILED DESCRIPTION

Figure 1:
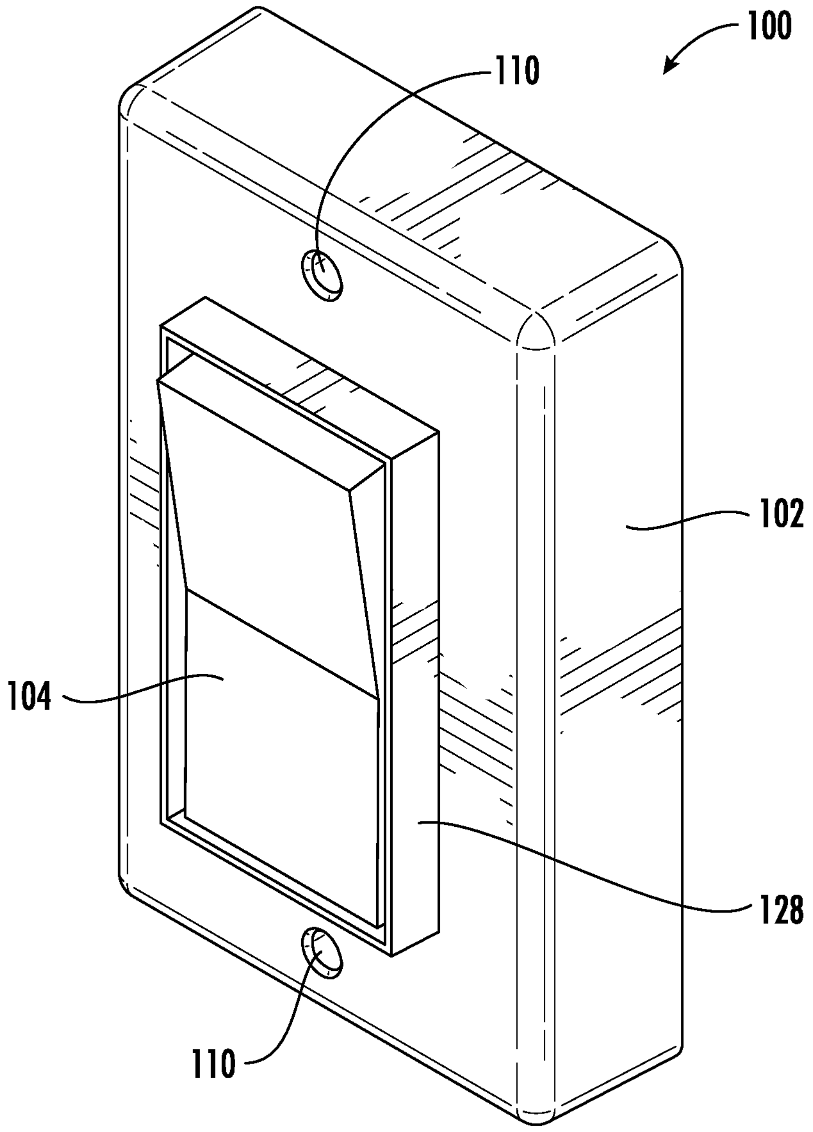
FIG. 1 is a perspective view of a toggle switch cover according to some embodiments.
Figure 2:
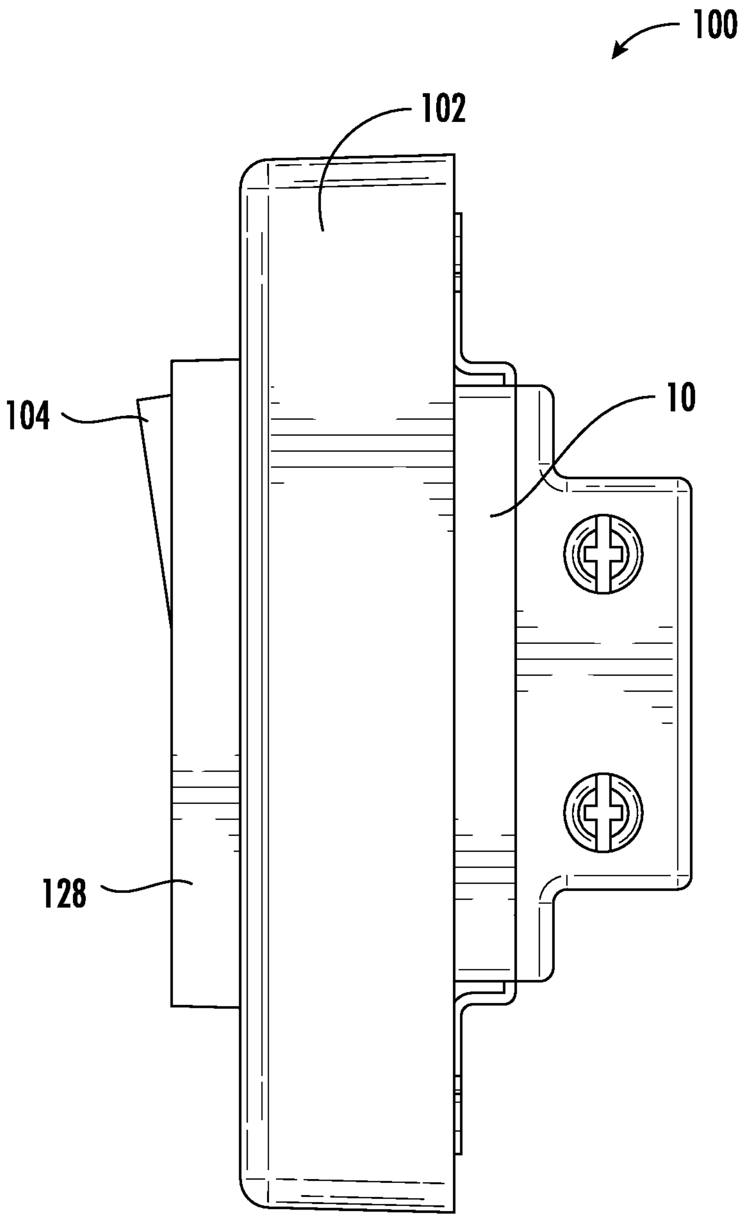
FIG. 2 is a right-side view of a toggle switch cover according to some embodiments.
Figure 3:
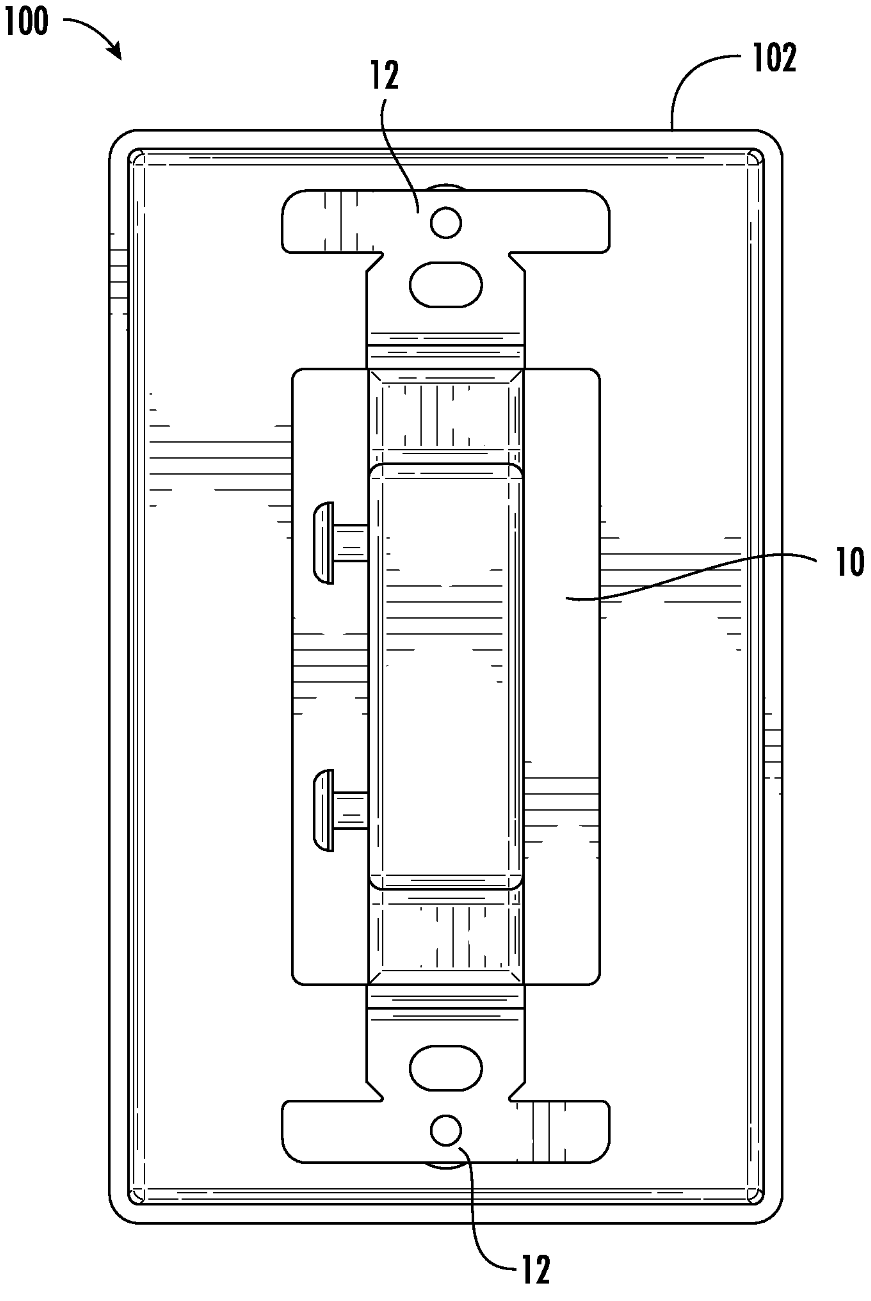
FIG. 3 is a rear view of a toggle switch cover according to some embodiments.
Figure 4:
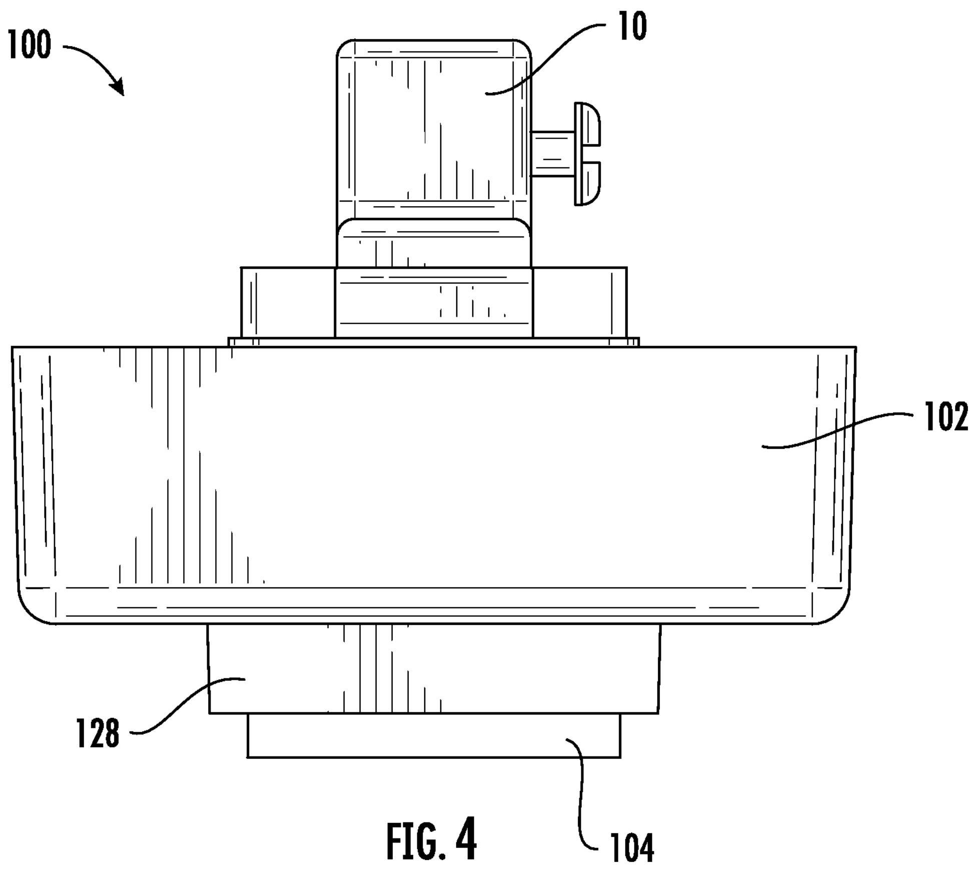
FIG. 4 is a top view of a toggle switch cover according to some embodiments.

Detailed aspects and applications of the disclosure are described below in the following drawings and detailed description of the technology. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the disclosure. It will be understood, however, by those skilled in the relevant arts, that embodiments of the technology disclosed herein may be practiced without these specific details. It should be noted that there are many different and alternative configurations, devices and technologies to which the disclosed technologies may be applied. The full scope of the technology disclosed herein is not limited to the examples that are described below.

The singular forms “a,” “an,” and “the” include plural referents unless the context clearly dictates otherwise. Thus, for example, reference to “a step” includes reference to one or more of such steps.

The word “exemplary,” “example,” or various forms thereof are used herein to mean serving as an example, instance, or illustration. Any aspect or design described herein as “exemplary” or as an “example” is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

When a range of values is expressed, another embodiment includes from the one particular value and/or to the other particular value. Similarly, when values are expressed as approximations, by use of the antecedent “about,” it will be understood that the particular value forms another embodiment. All ranges are inclusive and combinable.

Throughout the description and claims of this specification, the words "comprise" and "contain" and variations of the words, for example "comprising" and "comprises", mean "including but not limited to", and are not intended to (and do not) exclude other components.

As required, detailed embodiments of the present disclosure are included herein. It is to be understood that the disclosed embodiments are merely exemplary of the invention that may be embodied in various forms. Therefore, specific structural and functional details disclosed herein are not to be interpreted as limits, but merely as a basis for teaching one skilled in the art to employ the present invention. The specific examples below will enable the disclosure to be better understood. However, they are given merely by way of guidance and do not imply any limitation.

The present disclosure may be understood more readily by reference to the following detailed description taken in connection with the accompanying figures and examples, which form a part of this disclosure. It is to be understood that this disclosure is not limited to the specific materials, devices, methods, applications, conditions, or parameters described and/or shown herein, and that the terminology used herein is for the purpose of describing particular embodiments by way of example only and is not intended to be limiting of the claimed inventions. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

More specifically, this disclosure, its aspects and embodiments, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The present disclosure is related to an adjustable weatherproof switch cover 100. The switch cover 100 is configured to couple to an electrical switch 10 in a way that is adjustable so that the switch cover 100 can be adjusted to fit the electrical switch 10 as needed, whether the electrical switch 10 is not installed level with the structural surface or is installed too deep or too shallow on the structural surface. Additionally, the features of the switch cover 100 are designed to restrict water access to the electrical switch 10 without the need for a gasket. Thus, the switch cover 100 as disclosed herein is designed to effectively restrict water access to the electrical switch 10 and reliably couple with the electrical switch 10 so that the switch cover 100 does not interfere with the function and use of the electrical switch 10.

As shown in FIGS. 1-6, in some embodiments, the switch cover 100 comprises the electrical switch 10, a housing 102, a cover plate 104, and/or a plurality of plate screw bosses 106 extending rearward from a rear surface 108 of the cover plate 104. The electrical switch 10 is configured to be installed on a surface, such as a structural surface, and to toggle between an on position and an off position to close and open a circuit, respectively. The electrical switch 10 may be any style electrical switch. In some embodiments, the electrical switch 10 is a decora-style electrical switch.

Figure 8:
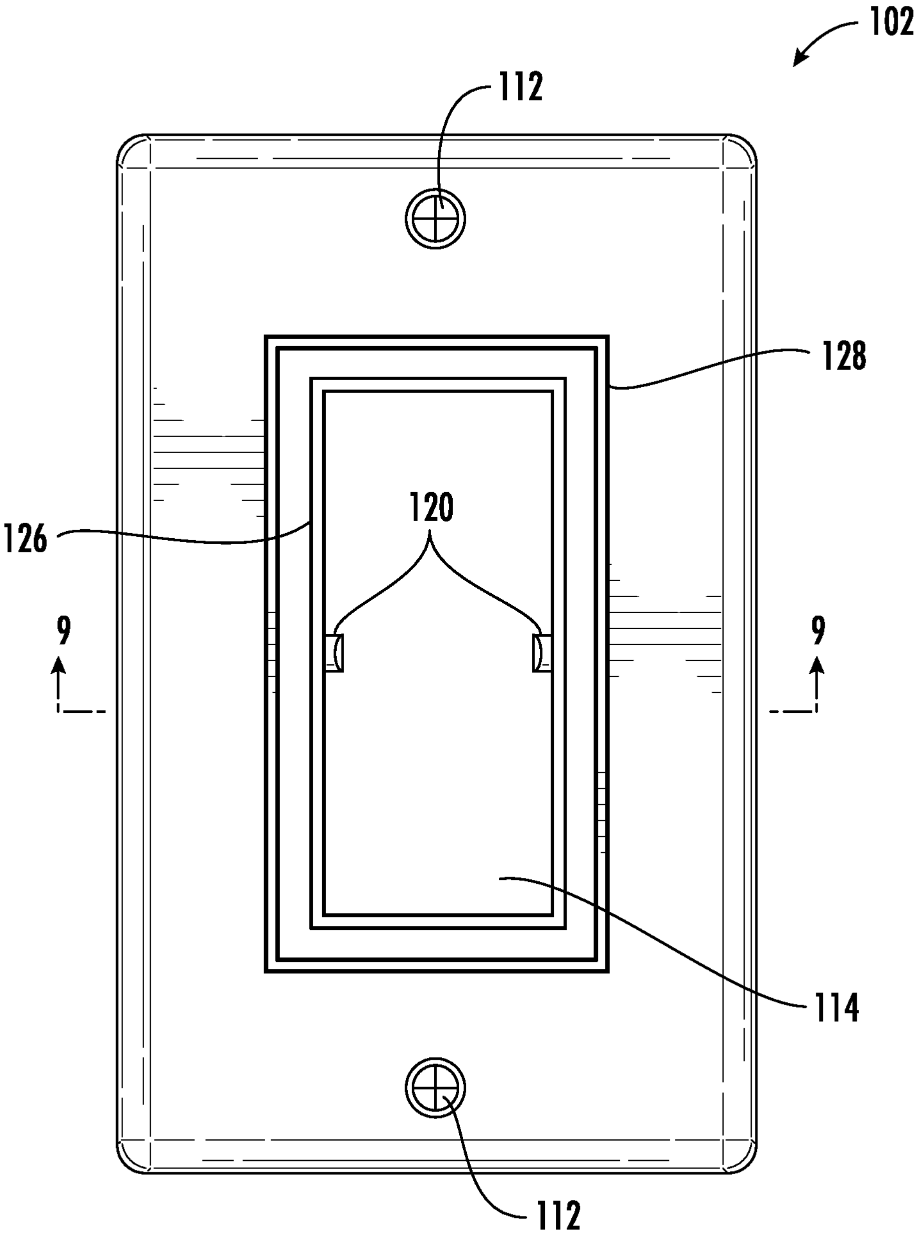
FIG. 8 is a front view of a toggle switch cover housing according to some embodiments with the cover plate removed.
Figure 9:
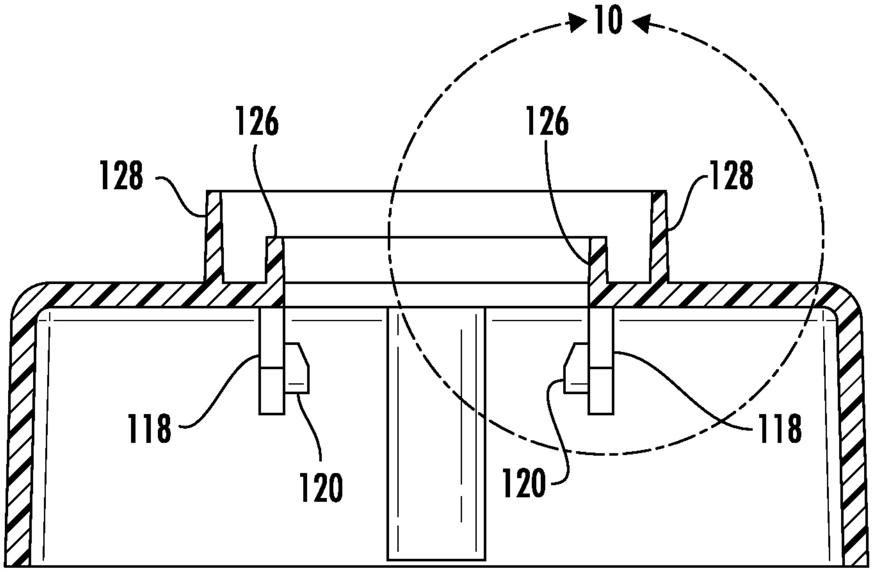
FIG. 9 is a cross section view taken from line 9-9 in FIG. 8.

The housing 102 is configured to couple with the electrical switch 10 and at least partially enclose the electrical switch 10 against the structural surface. Screws 112 or any other type of fastener may be used to couple the housing 102 to the electrical switch 10. The housing 102 may have at least one screw aperture 110 configured to receive a mounting screw 112 to couple the housing 102 with the electrical switch 10 (see FIG. 8). In some embodiments, housing 102 has two screw apertures. The screw apertures 110 may be configured to align with the yokes 12 of the electrical switch 10. In some embodiments, the at least one screw aperture 110 has a housing screw boss. In such embodiments, the screw boss may improve the ability of the housing 102 to restrict water access to the electrical switch 10.

In some embodiments, the housing 102 has a switch opening 114 extending through the housing 102. The switch opening 114 may be centered on the housing 102 and, when the housing 102 is coupled with the electrical switch 10, may be aligned with the electrical switch 10. This allows the cover plate 104, discussed in more detail below, to be positioned to cover the switch opening 114 and to operatively couple with the electrical switch 10. Thus, in some embodiments, the switch opening 114 is configured to expose the electrical switch 10.

In some embodiments, the housing 102 has one or more pivot supports 116, such as two pivot supports 116, each extending rearward from the housing 102 such that, when the housing 102 is coupled with the electrical switch 10, the pivot supports 116 extend toward the electrical switch 10. In embodiments with two pivot supports 116, the pivot support 116 may be positioned across from each other on either side of the switch opening 114. This allows the pivot supports 116 to couple with the cover plate 104 and allow the cover plate 104 to pivot, as explained in more detail below.

In some embodiments, the cover plate 104 has one or more pivot arms 118 that extend rearward from the cover plate 104. The pivot arms 118 may be configured to pivotably couple with the pivot supports 116 of the housing 102 and allow the cover plate 104 to pivot between a first position and a second position. Additionally, the pivot arms 118 may be configured to position the cover plate 104 to cover the switch opening 114 when the pivot arms 118 are coupled with the pivot supports 116.

Figure 10:
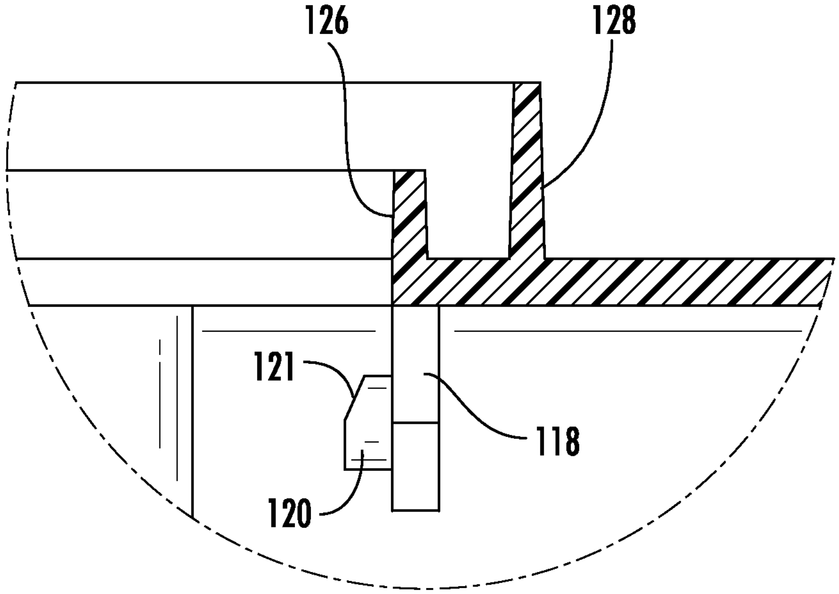
FIG. 10 is a close-up view taken from circle 10 in FIG. 9.

In some embodiments, each of the pivot supports 116 of the housing 102 has a pin 120 and each of the pivot arms 118 of the cover plate 104 has an aperture 122. Each pin 120 is configured to mate with one of the apertures 122 to pivotably couple the cover plate 104 to the housing 102. As seen best in FIG. 10, each pin 120 may have a sloped surface 121 to allow for easier engagement with the apertures 122. As will be apparent to one of skill in the art, the pins 120 and the apertures 122 can be switched such that each of the pivot arms 118 of the cover plate 104 has a pin 120 and each of the pivot supports 116 of the housing 102 has an aperture 122. Thus, in some embodiments, each of the pivot supports 116 of the housing 102 and the pivot arms 118 of the cover plate 104 has one of an aperture 122 and a pin 120 configured to mate with a corresponding aperture 122 or pin 120 to pivotably couple the cover plate 104 to the housing 102.

Figure 5:
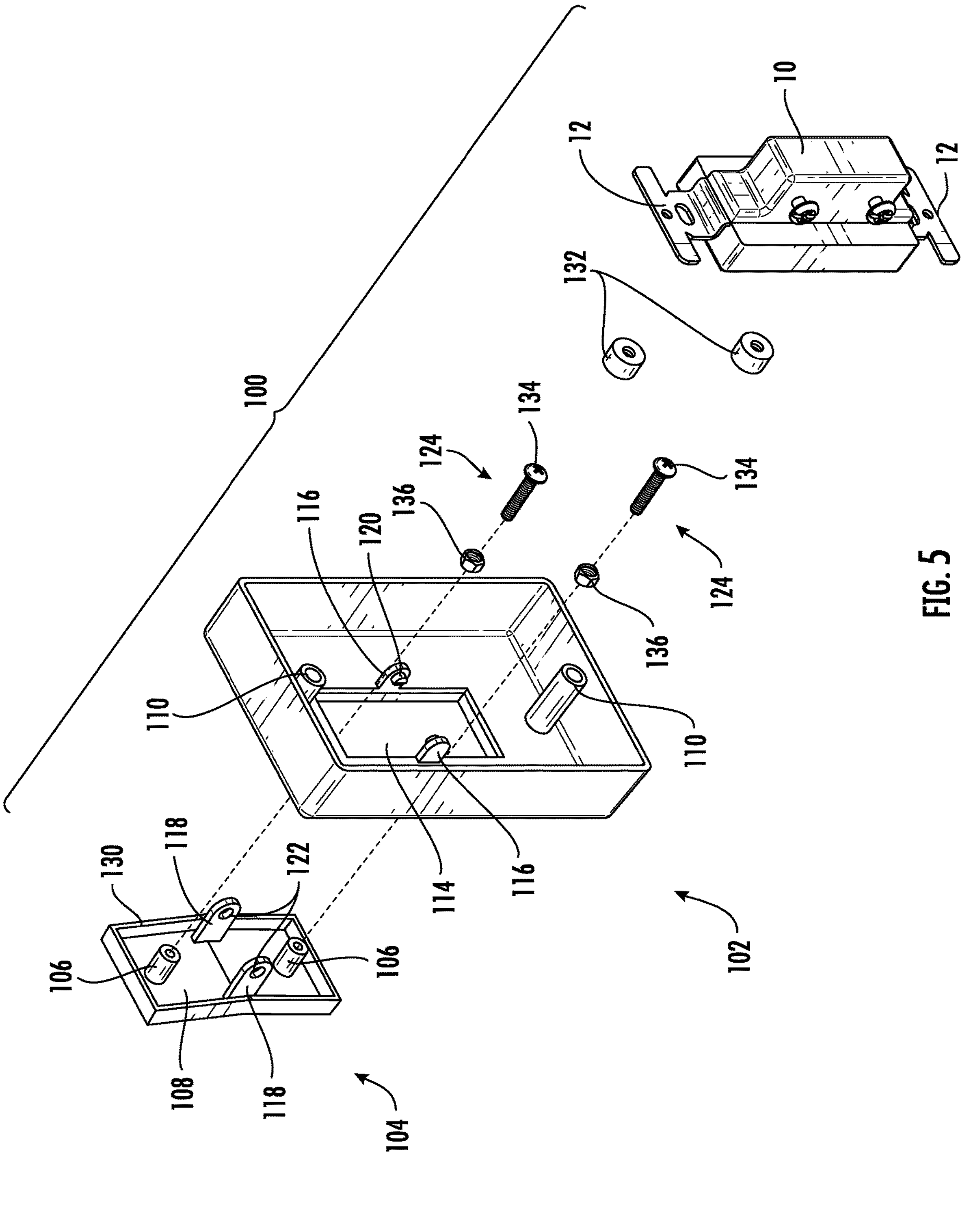
FIG. 5 is a rear exploded view of a toggle switch cover according to some embodiments.
Figure 6:
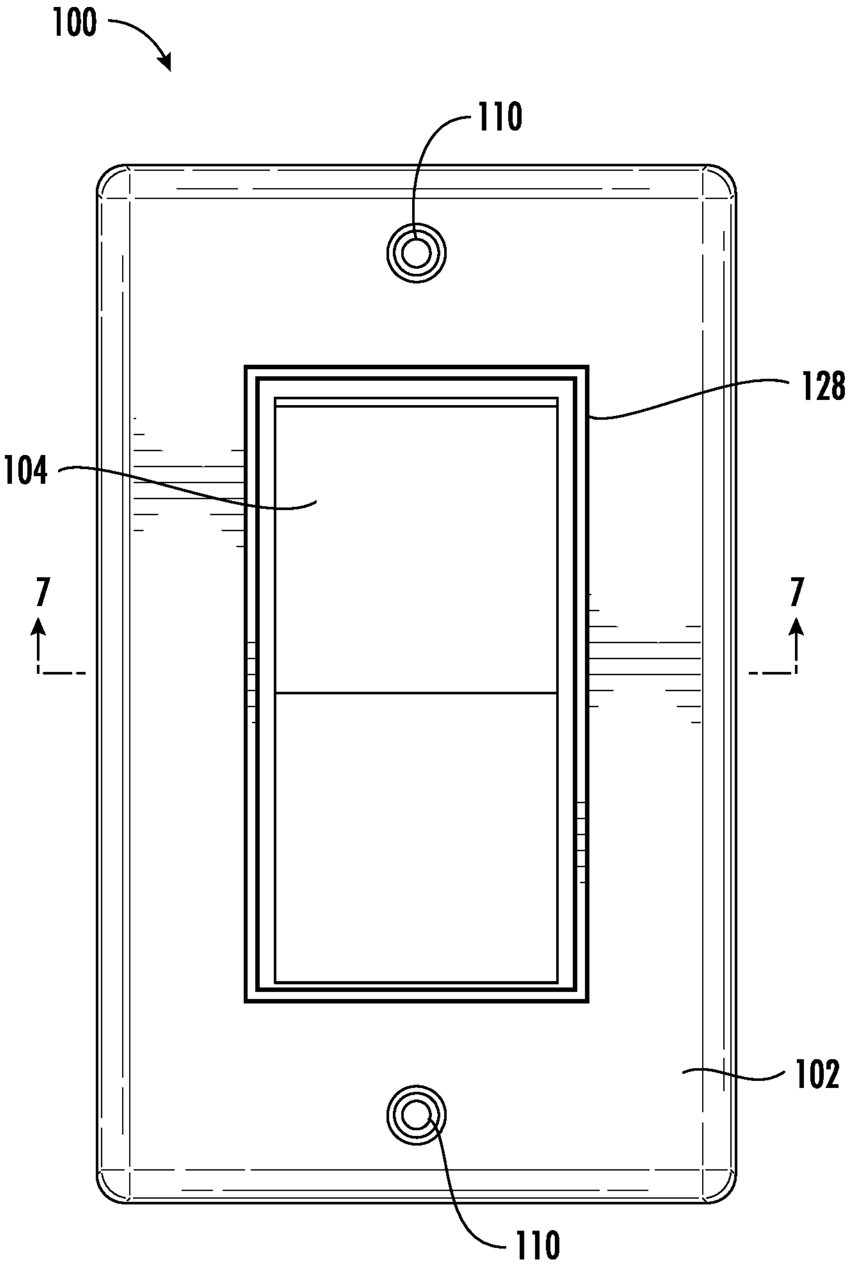
FIG. 6 is a front view of a toggle switch cover according to some embodiments.
Figure 7:
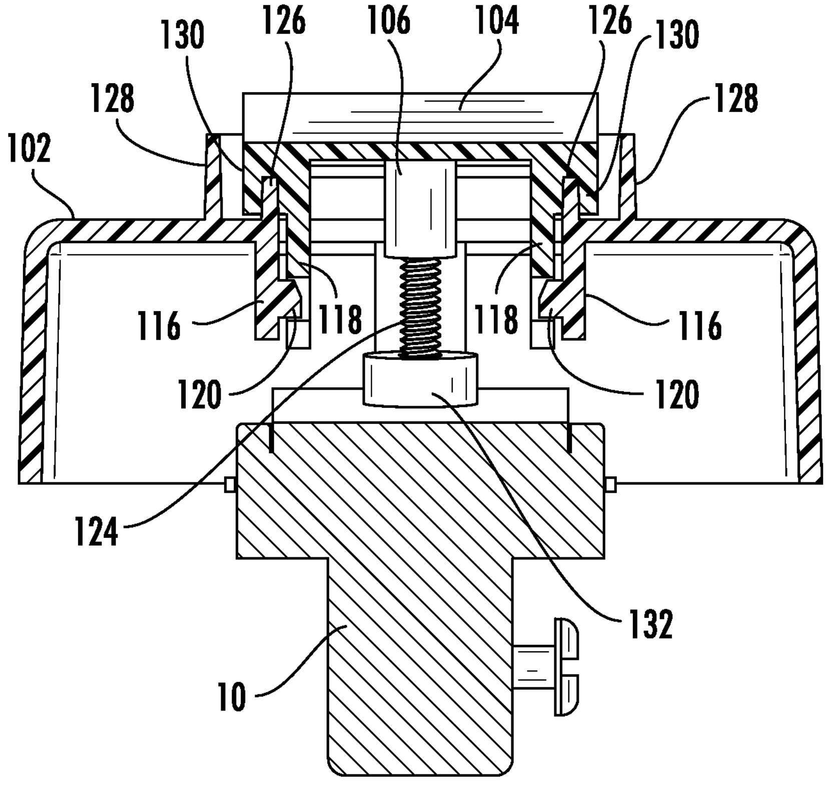
FIG. 7 is a cross section view taken from line 7-7 in FIG. 6.

As shown in FIGS. 5-7, the plate screw bosses 106 extend rearward of the rear surface 108 of the cover plate 104. Each of the plate screw bosses 106 is configured to receive a screw 124 such that the screw 124 can be threadedly coupled within the plate screw boss 106. Each of the screws 124 is adjustable such that an end 134 of the screw 124 can be moved closer to or further away from the cover plate 104 by rotating the screw 124 within the plate screw boss 106. This allows the screws 124 to be adjusted to establish contact between each of the screws 124 and the electrical switch 10 when the cover plate 104 is coupled to the housing 102 and the housing 102 is coupled to the electrical switch 10. Thus, when the cover plate 104 is moved to the first position, the electrical switch moves to the on position because the screws 124 transfer the motion of the cover plate 104 to the electrical switch 10. Similarly, when the cover plate 104 is moved to the second position, the electrical switch 10 moves to the off position. In this way, the cover plate 104 can be operatively coupled to the electrical switch 10 and the electrical switch 10 can be controlled by moving the cover plate 104 between the first position and the second position.

As shown in FIGS. 6-10, in some embodiments, the housing 102 also has an internal ridge 126 that surrounds the switch opening 114. In some embodiments, the internal ridge 126 extends forward from the housing 102. The housing 102 may also have an external ridge 128 that surrounds the internal ridge 126. In some embodiments, the external ridge 128 extends forward from the housing 102. Each of the internal ridge 126 and the external ridge 128 is configured to interact with the cover plate 104 to restrict water access to the electrical switch 10.

In some embodiments, the cover plate 104 has a lip 130 configured to insert between the external ridge 128 and the internal ridge 126 when the cover plate 104 is coupled with the housing 102. This creates a tortuous path for contaminants to enter the housing 102 and thus helps to restrict water access to the electrical switch 10. For water to enter the housing 102, it must pass around the external ridge 128, the lip 130, and the internal ridge 126. Additional ridges and lips may be used. In some embodiments, the lip 130 extends rearward from the cover plate 104. The internal ridge 126, the external ridge 128, and the lip 130 may each be continuous. It will be apparent to one of skill in the art that, in some embodiments, the internal ridge 126 and the external ridge 128 on the housing 102 and the lip 130 of the cover plate 104 could be switched, so that the internal ridge 126 and the external ridge 128 are on the cover plate 104 and the lip 130 is on the housing 102, without affecting the effectiveness or operation of the switch cover 100. Such a modification is thus considered within the scope of this disclosure and the claims under the doctrine of equivalents.

As shown in FIGS. 5 and 7, in some embodiments, the switch cover 100 also comprises one or more protective caps 132. A protective cap 132 may be positioned on the end 134 of each of the screws 124. The protective caps 132 are configured to protect the electrical switch 10 from damage caused by the contact between each of the screws 124 and the electrical switch 10. In some embodiments, the switch cover 100 also comprises one or more nuts 136 configured to threadedly couple with the screws 124 before the screws 124 are inserted into the screw bosses 106 (see FIG. 5). Once the screws 124 have been adjusted to the positions desired to operatively couple the cover plate 104 to the electrical switch 10, the nuts 136 can be tightened up against the screw bosses 106 to further lock the screws 124 in place and prevent the screws 124 from turning and losing contact with the electrical switch 10. However, some embodiments may not require nuts 136 by using a tight enough thread in the screw boss 106 that the screw 124 does not come loose or by using a thread locker to keep the screw from turning.

The switch cover 100 may be molded or cast from a metal material, or may be formed of a plastic using conventional plastic molding materials and methods known in the relevant art.

As described above, the switch cover 100 is configured to couple to an electrical switch 10 in a way that is adjustable so that the switch cover 100 can be adjusted to fit the electrical switch 10 as needed. This allows the switch cover 100 to reliably couple with the electrical switch 10 so that the switch cover 100 does not interfere with the function and use of the electrical switch 10 as occurs with nonadjustable switch covers. Additionally, the features of the switch cover 100 are designed to restrict water access to the electrical switch 10 without the need for a gasket. Thus, the switch cover 100 is adjustable and weatherproof.

Many additional implementations are possible. Further implementations are within the CLAIMS.

It will be understood that implementations of the switch cover include but are not limited to the specific components disclosed herein, as virtually any components consistent with the intended operation of various switch covers may be utilized. Accordingly, for example, it should be understood that, while the drawings and accompanying text show and describe particular switch cover implementations, any such implementation may comprise any shape, size, style, type, model, version, class, grade, measurement, concentration, material, weight, quantity, and/or the like consistent with the intended operation of switch covers.

The concepts disclosed herein are not limited to the specific switch covers shown herein. For example, it is specifically contemplated that the components included in particular switch covers may be formed of any of many different types of materials or combinations that can readily be formed into shaped objects and that are consistent with the intended operation of the switch cover. For example, the components may be formed of: rubbers (synthetic and/or natural) and/or other like materials; glasses (such as fiberglass), carbon-fiber, aramid-fiber, any combination therefore, and/or other like materials; elastomers and/or other like materials; polymers such as thermoplastics (such as ABS, fluoropolymers, polyacetal, polyamide, polycarbonate, polyethylene, polysulfone, and/or the like, thermosets (such as epoxy, phenolic resin, polyimide, polyurethane, and/or the like), and/or other like materials; plastics and/or other like materials; composites and/or other like materials; metals, such as zinc, magnesium, titanium, copper, iron, steel, carbon steel, alloy steel, tool steel, stainless steel, spring steel, aluminum, and/or other like materials; and/or any combination of the foregoing.

Furthermore, switch covers may be manufactured separately and then assembled together, or any or all of the components may be manufactured simultaneously and integrally joined with one another. Manufacture of these components separately or simultaneously, as understood by those of ordinary skill in the art, may involve 3-D printing, extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

In places where the description above refers to particular switch cover implementations, it should be readily apparent that a number of modifications may be made without departing from the spirit thereof and that these implementations may be applied to other implementations disclosed or undisclosed. The presently disclosed switch covers are, therefore, to be considered in all respects as illustrative and not restrictive.

I claim:

1. An adjustable weatherproof switch cover, comprising:

an electrical switch configured to be installed on a structural surface and toggle between an on position and an off position;

a housing configured to couple with the electrical switch and enclose the electrical switch against the structural surface, wherein the housing has:

a switch opening configured to expose the electrical switch;

two pivot supports extending rearward from the housing and positioned across from each other on either side of the switch opening;

an internal ridge extending forward from the housing surrounding the switch opening; and an external ridge extending forward from the housing surrounding the internal ridge;

a cover plate having two pivot arms extending rearward from the cover plate, the two pivot arms configured to pivotably couple with the two pivot supports of the housing to position the cover plate to cover the switch opening of the housing and allow the cover plate to pivot between a first position and a second position, wherein the cover plate further has a lip extending rearward from the cover plate configured to insert between the external ridge and the internal ridge when the cover plate is coupled with the housing to create a tortuous path for contaminants to enter the housing; and at least two screw bosses extending rearward from a rear surface of the cover plate, each of the at least two screw bosses having a screw threadedly coupled therein, wherein each of the screws is adjustable to establish contact between each of the screws and the electrical switch when the cover plate is coupled to the housing and operatively couple the cover plate to the electrical switch such that when the cover plate is moved to the first position, the electrical switch moves to the on position and when the cover plate is moved to the second position, the electrical switch moves to the off position.

2. The switch cover of claim 1, further comprising a protective cap positioned on an end of each of the screws and configured to protect the electrical switch from damage caused by the contact between each of the screws and the electrical switch.

3. The switch cover of claim 1, wherein the housing comprises at least one screw aperture configured to receive a mounting screw to couple the housing with the electrical switch.

4. The switch cover of claim 1, wherein each of the pivot supports of the housing and each of the pivot arms of the cover plate has one of a pin and a corresponding aperture and wherein each pin is configured to mate with the corresponding aperture to pivotably couple the cover plate to the housing.

5. An adjustable weatherproof switch cover, comprising:

an electrical switch configured to be installed on a structural surface and toggle between an on position and an off position;

a housing configured to couple with the electrical switch, wherein the housing has a switch opening configured to expose the electrical switch, an internal ridge extending forward from the housing surrounding the switch opening, and an external ridge extending forward from the housing surrounding the internal ridge; and a cover plate configured to pivotably couple with the housing and cover the switch opening of the housing, wherein the cover plate is pivotable between a first position and a second position and wherein the cover plate has a lip extending rearward from the cover plate configured to insert between the external ridge and the internal ridge when the cover plate is coupled with the housing to create a tortuous path for contaminants to enter the housing; and at least two screw bosses extending rearward from a rear surface of the cover plate, each of the at least two screw bosses having a screw threadedly coupled therein, wherein each of the screws is adjustable to establish contact between each of the screws and the electrical switch when the cover plate is coupled to the housing and operatively couple the cover plate to the electrical switch;

wherein the cover plate is configured to operatively couple with the electrical switch such that when the cover plate is moved to the first position, the electrical switch moves to the on position and when the cover plate is moved to the second position, the electrical switch moves to the off position.

6. The switch cover of claim 5, wherein the housing is configured to enclose the electrical switch against the structural surface.

7. The switch cover of claim 5, the housing further comprising two pivot supports extending rearward from the housing and positioned across from each other on either side of the switch opening, the cover plate having two pivot arms extending rearward from the cover plate, wherein the two pivot arms of the cover plate are configured to pivotably couple with the two pivot supports of the housing to allow the cover plate to pivot with respect to the housing.

8. The switch cover of claim 7, wherein each of the pivot supports of the housing and each of the pivot arms of the cover plate has one of a pin and a corresponding aperture and wherein each pin is configured to mate with the corresponding aperture to pivotably couple the cover plate to the housing.

9. The switch cover of claim 5, further comprising a protective cap positioned on an end of each of the screws and configured to protect the electrical switch from damage caused by the contact between each of the screws and the electrical switch.

10. An adjustable weatherproof switch cover, comprising:

a housing configured to couple with an electrical switch, wherein the electrical switch is configured to toggle between an on position and an off position and wherein the housing has a switch opening configured to expose the electrical switch;

a cover plate configured to pivotably couple with the housing and cover the switch opening of the housing, wherein the cover plate is pivotable between a first position and a second position; and at least one protrusion extending rearward from a rear surface of the cover plate, wherein each of the at least one protrusion is adjustable to establish contact between the at least one protrusion and the electrical switch when the cover plate is coupled to the housing and the housing is coupled to the electrical switch, wherein the at least one protrusion is configured to operatively couple the cover plate to the electrical switch such that when the cover plate is moved to the first position, the electrical switch moves to the on position and when the cover plate is moved to the second position, the electrical switch moves to the off position.

11. The switch cover of claim 10, wherein the electrical switch is configured to be installed on a structural surface and the housing is configured to enclose the electrical switch against the structural surface.

12. The switch cover of claim 10, the housing further comprising two pivot supports extending rearward from the housing and positioned across from each other on either side of the switch opening, the cover plate having two pivot arms extending rearward from the cover plate, wherein the two pivot arms of the cover plate are configured to pivotably couple with the two pivot supports of the housing to allow the cover plate to pivot with respect to the housing.

13. The switch cover of claim 12, wherein each of the pivot supports of the housing and the pivot arms of the cover plate has one of a pin and a corresponding aperture and wherein each pin is configured to mate with the corresponding aperture to pivotably couple the cover plate to the housing.

14. The switch cover of claim 10, wherein the at least one protrusion comprises a screw threadedly coupled with a screw boss on the rear surface of the cover plate.

15. The switch cover of claim 10, wherein the housing has an internal ridge surrounding the switch opening and the cover plate has a lip configured to extend around the internal ridge of the housing when the cover plate is coupled with the housing to create a tortuous path for contaminants to enter the housing.

16. The switch cover of claim 10, wherein the housing has an external ridge surrounding the switch opening and the cover plate has a lip extending away from the cover plate, wherein the external ridge of the housing is configured to extend around the lip of the cover plate when the cover plate is coupled with the housing to create a tortuous path for contaminants to enter the housing.

17. The switch cover of claim 10, wherein one of the housing and the cover plate has an internal ridge and an external ridge surrounding the internal ridge and wherein the other of the housing and the cover plate has a lip configured to insert between the external ridge and the internal ridge when the cover plate is coupled with the housing to create a tortuous path for contaminants to enter the housing.

18. The switch cover of claim 10, further comprising a protective cap positioned on an end of each of the at least one protrusion and configured to protect the electrical switch from damage caused by the contact between each of the at least one protrusion and the electrical switch.

19. The switch cover of claim 10, wherein the housing comprises at least one screw aperture configured to receive a mounting screw to couple the housing with the electrical switch.

* * * * *